(12) United States Patent
Chen et al.

(10) Patent No.: US 8,531,598 B2
(45) Date of Patent: Sep. 10, 2013

(54) IMAGE PROCESSING METHOD AND RELATED APPARATUS FOR GENERATING TARGET IMAGE BLOCK

(75) Inventors: Chung-Yi Chen, Nantou County (TW); Su-Chun Wang, Taipei County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1030 days.

(21) Appl. No.: 12/188,217

(22) Filed: Aug. 8, 2008

(65) Prior Publication Data
US 2009/0167935 A1 Jul. 2, 2009

(30) Foreign Application Priority Data
Jan. 2, 2008 (TW) ............... 97100030 A

(51) Int. Cl.
*H04N 7/01* (2006.01)
*H04N 11/20* (2006.01)

(52) U.S. Cl.
USPC ........... 348/441; 348/699; 348/700; 348/701; 382/300; 375/240

(58) Field of Classification Search
USPC 348/699–701; 382/300; 375/240.16–240.17
See application file for complete search history.

(56) References Cited

U.S. PATENT DOCUMENTS

| 5,471,252 A * | 11/1995 | Iu ................................... 348/699 |
| 7,729,558 B2 * | 6/2010 | Kondo et al. ................. 382/275 |
| 2004/0233991 A1 * | 11/2004 | Sugimoto et al. ........ 375/240.16 |
| 2004/0247031 A1 * | 12/2004 | Hagai et al. ............. 375/240.16 |
| 2006/0110051 A1 | 5/2006 | Kondo |
| 2006/0256238 A1 * | 11/2006 | Mishima et al. ............. 348/459 |

* cited by examiner

*Primary Examiner* — Pankaj Kumar
*Assistant Examiner* — Charles N Hicks
(74) *Attorney, Agent, or Firm* — Winston Hsu; Scott Margo

(57) ABSTRACT

An image processing method of generating a target image block of a position to be currently interpolated in an interpolated frame between two frames includes: performing a motion estimation for generating a motion vector by referring to a plurality of image blocks of the two frames and generating a first image block according to the motion vector; generating a second image block according to two image blocks which are respectively in the two frames and both correspond to the position to be currently interpolated; and generating the target image block according to the first image block and the second image block.

10 Claims, 3 Drawing Sheets

IMAGE PROCESSING METHOD AND RELATED APPARATUS FOR GENERATING TARGET IMAGE BLOCK

BACKGROUND OF THE INVENTION

1. Field of the Invention

The present invention relates to an image processing mechanism, and more particularly, to an image processing method and a related apparatus for interpolating a target image block thereby effectively preventing artifact phenomenon.

2. Description of the Prior Art

In an image interpolation process, a motion vector is determined and utilized to interpolate an image block to the position to be interpolated in order to generate an image block that is required by a position to be interpolated in an interpolated frame between two frames. In some special cases, however, the artifact phenomenon will be visible to the human eye if the motion vector is directly utilized to interpolate corresponded image blocks to the position to be interpolated. Please refer to FIG. 1. FIG. 1 is a diagram of a conventional image processing mechanism for generating an image block required by a position to be interpolated. The frames $F_{n-1}$ and $F_n$ are consecutive frames, and the conventional mechanism performs an image interpolation to the frames $F_{n-1}$ and $F_n$ so as to generate an interpolated frame F' (as shown by the dotted line in the figure). For simplicity of illustration, FIG. 1 only shows illustrative patterns of different image blocks on a certain horizontal position of the frames $F_{n-1}$ and $F_n$. In practice, the image blocks $A_1$ and $A_1'$ of the frames $F_{n-1}$ and $F_n$ correspond to the same image object moving horizontally, and other image blocks such as $A_2$ and $A_2'$ represent the same background of the horizontal position in the frames $F_{n-1}$ and $F_n$. As shown in FIG. 1, the image object corresponding to the image block $A_1$ moves to the position $P_1$ in the interpolated frame F'. According to the motion estimation result of the conventional image processing mechanism, the image object corresponding to the image block $A_1$ is estimated to move to the position $P_1$ in the interpolated frame F' by referring to the image blocks $A_1$ and $A_1'$ of the frames $F_{n-1}$ and $F_n$, so the image block $A_1''$ can be interpolated precisely at the position $P_1$. Similarly, it can also be determined that the image object corresponding to the image blocks $A_2$ and $A_2'$ is supposed to be at the position $P_2$ in the interpolated frame F' by referring to the positions of the image blocks $A_2$ and $A_2'$ (that is, the background part) in the frames $F_{n-1}$ and $F_n$, so the image block $A_2''$ can therefore be correctly interpolated at the position $P_2$.

However, when the conventional image processing mechanism is about to interpolate the image at the position $P_3$ in the interpolated frame F', an artifact phenomenon which may cause a serious image distortion will be possibly generated because an image object corresponding to the image block $A_1$ has moved to the position $P_1$ in the interpolated frame F' and therefore the position $P_3$ is supposed to show the background part originally covered by the image object. However, when the conventional image processing mechanism calculates the minimum pixel differences to perform motion estimation, an image block which is similar to the image block at the position $P_3$ in the frame $F_{n-1}$ cannot be found at the same position $P_3$ in the frame $F_n$. This is because the background part at the position $P_3$ was covered by the image object corresponding to the image block $A_1$. Even though a motion vector corresponding to a certain minimum sum of absolute difference (SAD) of pixel values can still be found, utilizing the motion vector to generate the image block at the position $P_3$ in the interpolated frame F' may cause more serious image distortion or the artifact phenomenon; for example, the unwanted image block A'' may be generated at the position $P_3$ in the interpolated frame F'.

SUMMARY OF THE INVENTION

To solve the above-mentioned problem, it is therefore one of the objectives of the present invention to provide a method and its related apparatus for interpolating a target image block between two frames thereby effectively preventing artifact generation.

According to one embodiment, the present invention discloses an image processing method of generating a target image block of a position to be currently interpolated in an interpolated frame between two frames. The image processing method comprises: performing a motion estimation for generating a motion vector by referring to a plurality of image blocks of the two frames and generating a first image block according to the motion vector; generating a second image block according to two image blocks which are respectively in the two frames and both correspond to the position to be currently interpolated; and generating the target image block according to the first image block and the second image block.

According to one embodiment, the present invention further discloses an image processing apparatus for generating a target image block of a position to be currently interpolated in an interpolated frame between two frames. The image processing apparatus comprises: a motion compensation circuit, an image generation circuit and a decision circuit. The motion compensation circuit performs a motion estimation to generate a motion vector by referring to a plurality of image blocks of the two frames and generating a first image block according to the motion vector; the image generation circuit generates a second image block according to two image blocks which are respectively in the two frames and both correspond to the position to be currently interpolated; and the decision circuit is coupled to the motion compensation circuit and the image generation circuit for generating the target image block according to the first image block and the second image block.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
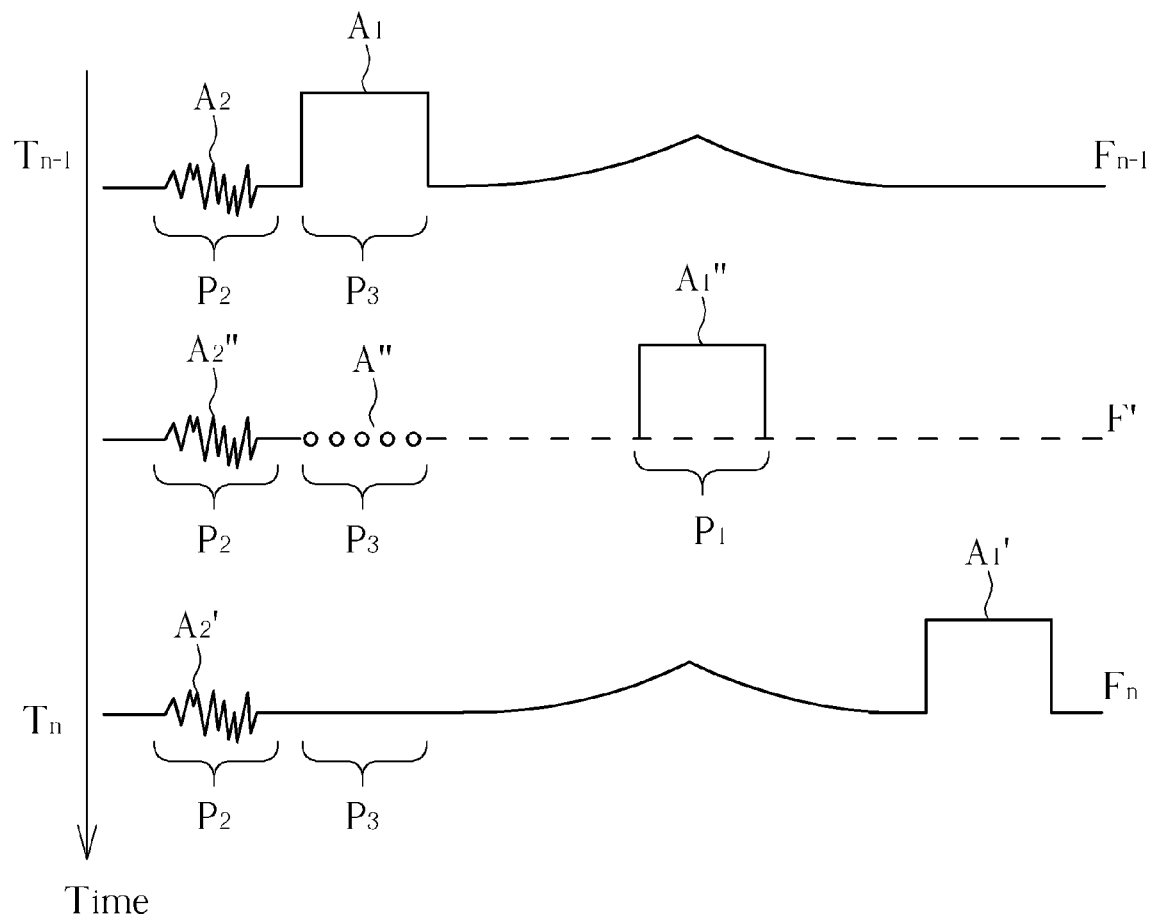
FIG. 1 is a diagram of a conventional image processing mechanism for generating an image block required by a position to be interpolated.
Figure 2:
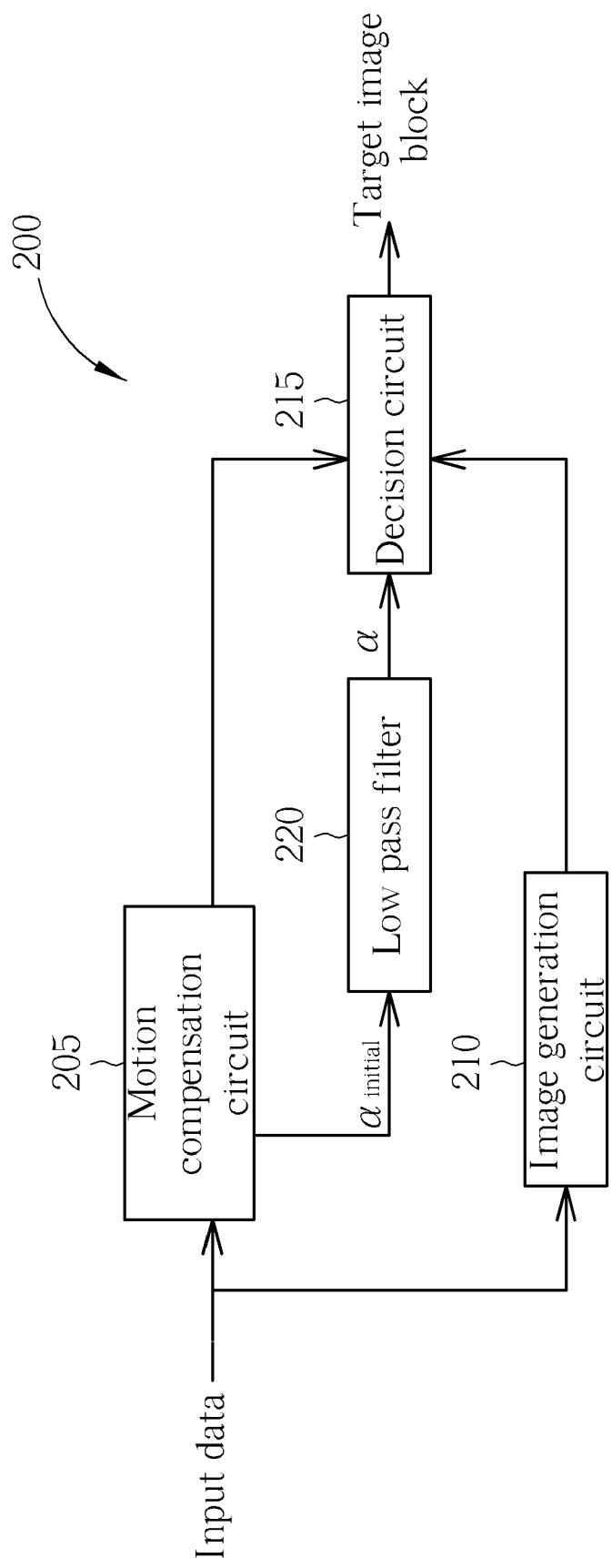
FIG. 2 is a diagram of the image processing apparatus according to an embodiment of the present invention.
Figure 3:
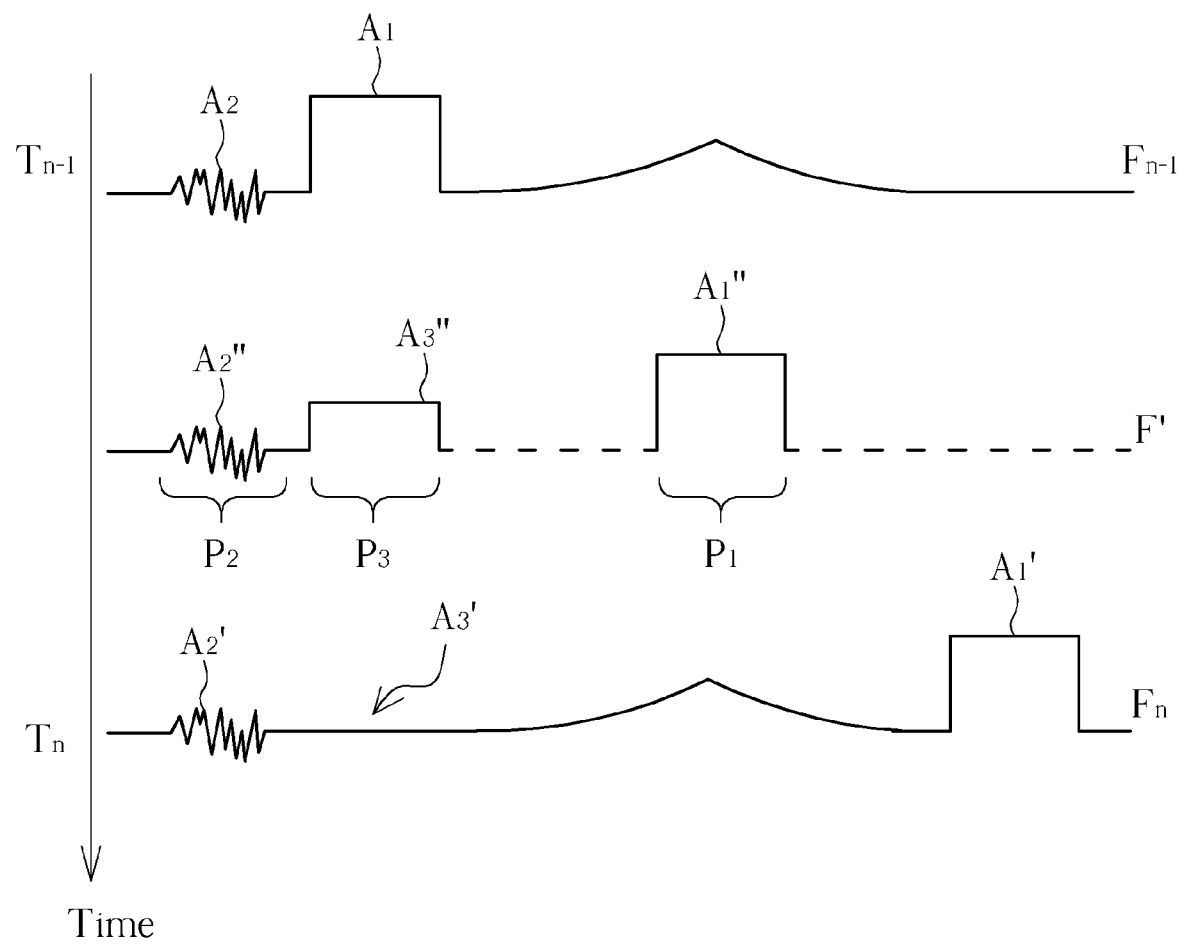
FIG. 3 is an operational diagram illustrating the operation of generating a target image block by the image processing apparatus as shown in FIG. 2 for the position to be interpolated.

Please refer to FIG. 2 and FIG. 3 together. FIG. 2 is a diagram of the image processing apparatus 200 according to an embodiment of the present invention. FIG. 3 illustrates the operation of generating a target image block by the image processing apparatus 200 for the position to be interpolated (e.g. the position $P_1$, $P_2$ or $P_3$). As shown in FIG. 2, the image processing apparatus 200 receives input data consisting of a plurality of frames, and generates a target image block required by a position to be currently interpolated in an interpolated frame between two frames, such as the two frames $F_{n-1}$ and $F_n$ shown in FIG. 3. The position to be interpolated can be the position $P_1$, $P_2$ or $P_3$ in the interpolated frame F'. To simplify the illustration, only illustrative patterns of different image blocks on a certain horizontal position of the frames $F_{n-1}$ and $F_n$ are shown in FIG. 3. The image processing apparatus 200 comprises: a motion compensation circuit 205, an image generation circuit 210, a decision circuit 215 and a low pass filter 220. The motion compensation circuit 205 performs a motion estimation for determining a motion vector mv by calculating block matching differences of a plurality of image blocks in the frames $F_{n-1}$ and $F_n$ and then determines an image block $B_1$ according to the motion vector mv, where a block matching difference can be the sum of absolute differences (SAD) of pixel values of two image blocks, and the image block $B_1$ is generated by performing a motion compensation to the position to be interpolated (one of the positions $P_1$, $P_2$ and $P_3$). The image generation circuit 210 generates an image block $B_2$ according to the pixel values of the two image blocks which are respectively in the frames $F_{n-1}$ and $F_n$ and both correspond to the position to be interpolated. In this embodiment, the two image blocks corresponding to a certain position to be interpolated are at the same spatial position as the position to be interpolated. The image block $B_2$ is generated by means of direct interpolation of the two image blocks by the image generation circuit 210. In a preferred embodiment the image generation circuit 210 averages the pixel values of the two image blocks directly to generate the image block $B_2$. Then, the decision circuit 215 determines the above-mentioned target image block according to the image blocks $B_1$ and $B_2$, and the determined image block is the final image block required by a position to be interpolated. Here, the image block $B_2$ is a non-motion-compensated image block, which means that there is no need to determine a motion vector in generating the image block $B_2$; on the contrary, the image block $B_1$ is a motion-compensated image block.

The process of determining the target image block according to the image blocks $B_1$ and $B_2$ is illustrated as follows. First, the image processing apparatus 200 determines a target weighting parameter $\alpha$ according to the value of the block matching difference corresponding to the motion vector mv. The decision circuit 215 is an image blending circuit for blending the pixel values of the image blocks $B_1$ and $B_2$ to generate the target image block according to the target weighting parameter $\alpha$. The target weighting parameter $\alpha$ falls between 0 and 1, and is substantially proportional to the value of the block matching difference. The pixel value of the target image block $P_{tar}$ is designed to have the following relation with the pixel values $P_1$, $P_2$ of the image blocks $B_1$ and $B_2$: $P_{tar}=(1-\alpha)\times P_1+\alpha\times P_2$. A larger value of the block matching difference corresponding to the motion vector mv implies that the image block $B_1$ determined by the motion compensation circuit 205 is more unreliable and is therefore less suitable to be directly interpolated to the position to be interpolated to prevent the artifact phenomenon. Therefore, the target weighting parameter $\alpha$ is designed to be closer to the positive integer 1 so that the pixel value $P_{tar}$ of the target image block is mostly determined by the pixel value $P_2$ of the image block $B_2$ generated by the image generation circuit 210, thus effectively preventing the artifact phenomenon. On the other hand, a smaller value of the block matching difference corresponding to the motion vector mv implies that the image block $B_1$ determined by the motion compensation circuit 205 is more reliable and is therefore more suitable to be directly interpolated to the position to be interpolated to improving the image quality. Therefore, the target weighting parameter $\alpha$ is designed to be closer to 0 so that the pixel value $P_{tar}$ of the target image block is mostly determined by the pixel value $P_1$ of the image block $B_1$ generated by the motion compensation circuit 205.

Please refer to FIG. 3 again for further explanation. To determine the target image block of the position $P_1$ to be interpolated, the motion compensation circuit 205 will find that the difference between the image block $A_1$ in the frame $F_{n-1}$ and the image block $A_1'$ in the frame $F_n$ is a minimum block matching difference. The motion compensation circuit 205 therefore estimates that the image object corresponding to the image block $A_1$ should be at the position $P_1$ to be interpolated in the interpolated frame F'. Because the image block $A_1$ in the frame $F_{n-1}$, and the image block $A_1'$ in the frame $F_n$ correspond to the same image object, so the value of the minimum block matching difference will be very small, and a target weighting parameter decided according to the minimum block matching difference is almost zero. As a result, the pixel values of the final image block $A_1''$ at the position $P_1$ are almost totally determined by the pixel values of the image block $A_1/A_1'$ in the frame $F_{n-1}/F_n$. In other words, the image processing apparatus 200 can be considered to interpolate the image object of the image block $A_1/A_1'$ in the frame $F_{n-1}/F_n$ to the position $P_1$ to be interpolated in the interpolated frame F'. Similarly, for determining a target image block of the position $P_2$ to be interpolated in the interpolated frame F', a determined target weighting parameter is almost zero, and the pixel values of a final image block $A_2''$ at the position $P_2$ are almost totally determined by the pixel values of the image block $A_2/A_2'$ in the frame $F_{n-1}/F_n$. Therefore, the image processing apparatus 200 can be considered to interpolate the image object of the image block $A_2/A_2'$ in the frame $F_{n-1}/F_n$ to the position $P_2$ to be interpolated in the interpolated frame F'''.

To determine the target image block of the position $P_3$ to be interpolated, the motion compensation circuit 205 also calculates the difference between a certain image block in the frame $F_{n-1}$ and another image block in the frame $F_n$, and a minimum block matching difference can also be found although the value may not be relatively small. The result of the interpolation of the two image blocks is the image block $B_1$ and is output to the decision circuit 215. However, the image at the position $P_3$ to be interpolated is supposed to be the background part covered by the image object corresponding to the image block $A_1$ in the frame $F_{n-1}$, but the two image blocks selected by the motion compensation circuit 205 may possibly correspond to different image objects; therefore the value of the minimum block matching difference may be relatively large. The target weighting parameter decided according to the minimum block matching difference is possibly close to the integer 1. As a result, the pixel values of the final target image block $A_3''$ at the position $P_3$ are almost totally determined by averaging the pixel values of the two image blocks $A_1$ and $A_3'$ at the same position $P_3$ in the frames $F_{n-1}$ and $F_n$ by the image generation circuit 210. This method can prevent generating artifact phenomenon.

Moreover, because the target weighting parameter $\alpha$ affects the pixel value $P_{tar}$ and the image quality, this embodiment further uses the low pass filter 220 to adjust the target weighting parameter $\alpha$ so that the target weighting parameters $\alpha$ respectively corresponding to a plurality of positions to be interpolated in a certain area (e.g., an area comprising 3×3 or 5×5 image blocks) will be more consistent. This can prevent too much difference between the image generated at a certain position to be interpolated and the image generated at its neighboring positions to be interpolated. In detail, the motion compensation circuit 205 determines an initial weighting parameter $\alpha_{initial}$ at the position to be interpolated according to the value of the block matching difference corresponding to the motion vector mv, and then the image processing apparatus 200 generates the target weighting parameter $\alpha$ of the position to be currently interpolated according to the initial weighting parameters $\alpha_{initial}$ and the corresponding target weighting parameters used in generating target image blocks of the neighboring positions to be interpolated in the interpolated frame F'. The low pass filter 220 calculates an average value of the corresponding target weighting parameter and the initial weighting parameter $\alpha_{initial}$, and the average value is then determined to be the target weighting parameter $\alpha$. Of course, this embodiment is not meant to limit this method of generating the target weighting parameter $\alpha$, and any methods of determining the value of the target weighting parameter $\alpha$ falls within the scope of this invention. For example, the target weighting parameter $\alpha$ can be generated by performing a weighted average on the corresponding target weighting parameters and the initial weighting parameter $\alpha_{initial}$.

Those skilled in the art will readily observe that numerous modifications and alterations of the apparatus and method may be made while retaining the teachings of the invention.

What is claimed is:

1. An image processing method of generating a target image block of a position to be currently interpolated in an interpolated frame between two frames, comprising:
    performing a motion estimation for generating a motion vector by referring to a plurality of image blocks of the two frames, and generating a first image block according to the motion vector;
    generating a second image block according to two image blocks which are respectively in the two frames and both correspond to the position to be currently interpolated;
    generating a target weighting parameter according to the value of a block matching difference corresponding to the motion vector; and
    generating the target image block according to the first image block and the second image block, comprising:
        generating the target image block by calculating a weighted average of the first image block and the second image block according to the target weighting parameter.

2. The method of claim 1, wherein the first image block is a motion-compensated image block, and the second image block is a non-motion-compensated image block.

3. The method of claim 1, wherein the target weighting parameter $\alpha$ falls between 0 and 1, and is substantially proportional to the value of the block matching difference, and the pixel value $P_{tar}$ of the target image block is determined by: $P_{tar}=(1-\alpha) \times P_1 + \alpha \times P_2$.

4. The method of claim 1, wherein generating a target weighting parameter according to the value of the block matching difference corresponding to the motion vector comprises:
    generating an initial weighting parameter corresponding to the position to be currently interpolated according to the value of the block matching difference corresponding to the motion vector; and
    generating the target weighting parameter corresponding to the position to be currently interpolated according to the initial weighting parameter and a corresponding target weighting parameter used in generating a corresponding image block of a neighboring position to be interpolated in the interpolated frame.

5. The method of claim 4, wherein the step of generating the target weighting parameter corresponding to the position to be currently interpolated comprises:
    calculating an average value of the initial weighting parameter and the corresponding target weighting parameter used in generating the corresponding image block of the neighboring position to be interpolated; wherein the average value is the target weighting parameter.

6. An image processing apparatus, for generating a target image block of a position to be currently interpolated in an interpolated frame between two frames, comprising:
    a motion compensation circuit, for performing a motion estimation to generate a motion vector by referring to a plurality of image blocks of the two frames, and generating a first image block according to the motion vector;
    an image generation circuit, for generating a second image block according to two image blocks which are respectively in the two frames and both correspond to the position to be currently interpolated; and
    a decision circuit, coupled to the motion compensation circuit and the image generation circuit, for generating the target image block according to the first image block and the second image block;
    wherein the apparatus generates a target weighting parameter according to the value of a block matching difference corresponding to the motion vector, and the decision circuit is an image blending circuit, which generates the target image block by calculating a weighted average of the first image block and the second image block according to the target weighting parameter.

7. The apparatus of claim 6, wherein the first image block is a motion-compensated image block, and the second image block is a non-motion-compensated image block.

8. The method of claim 6, wherein the target weighting parameter $\alpha$ falls between 0 and 1 and is substantially proportional to the value of the block matching difference, and the pixel value $P_{tar}$ of the target image block is generated by: $P_{tar}=(1-\alpha) \times P_1 + \alpha \times P_2$.

9. The apparatus of claim 6, wherein the motion compensation circuit generates an initial weighting parameter corresponding to the position to be currently interpolated according to the value of the block matching difference corresponding to the motion vector; and the image processing apparatus generates the target weighting parameter corresponding to the position to be currently interpolated according to the initial weighting parameter and the corresponding target weighting parameter used in generating a corresponding image block of a neighboring position to be interpolated in the interpolated frame.

10. The apparatus of claim 9, further comprising:
    a low pass filter, coupled to the motion compensation circuit and the image blending circuit, for calculating an average value of the initial weighting parameter and the corresponding target weighting parameter used in generating the corresponding image block of the neighboring position to be interpolated; wherein the average value is the target weighting parameter.

* * * * *